(12) United States Patent
Hillman et al.

(10) Patent No.: US 10,816,072 B2
(45) Date of Patent: Oct. 27, 2020

(54) LOCKING DIFFERENTIAL ASSEMBLY

(71) Applicant: EATON INTELLIGENT POWER LIMITED, Dublin (IE)

(72) Inventors: Chad Robert Hillman, Ceresco, MI (US); Jordan Robert Allen, Marshall, MI (US)

(73) Assignee: Eaton Intelligent Power Limited, Dublin (IE)

( * ) Notice: Subject to any disclaimer, the term of this patent is extended or adjusted under 35 U.S.C. 154(b) by 39 days.

(21) Appl. No.: 16/334,242

(22) PCT Filed: Sep. 16, 2017

(86) PCT No.: PCT/US2017/051942
§ 371 (c)(1),
(2) Date: Mar. 18, 2019

(87) PCT Pub. No.: WO2018/057437
PCT Pub. Date: Mar. 29, 2018

(65) Prior Publication Data
US 2019/0226566 A1    Jul. 25, 2019

Related U.S. Application Data

(60) Provisional application No. 62/397,205, filed on Sep. 20, 2016.

(51) Int. Cl.
*F16H 48/34* (2012.01)
*F16H 48/24* (2006.01)
(Continued)

(52) U.S. Cl.
CPC .......... *F16H 48/34* (2013.01); *B60K 17/165* (2013.01); *B60K 23/04* (2013.01); *F16D 27/118* (2013.01);
(Continued)

(58) Field of Classification Search
None
See application file for complete search history.

(56) References Cited

U.S. PATENT DOCUMENTS 6,551,209 B2 *   4/2003   Cheadle .................. F16H 48/22
                                                192/84.92
8,858,385 B2 *  10/2014   Forrest .................... F16H 48/24
                                                475/231
(Continued)

FOREIGN PATENT DOCUMENTS

WO    WO 2008/094586        9/2008

OTHER PUBLICATIONS

International Search Report and Written Opinion for International Application No. PCT/US2017//051942 dated Dec. 22, 2017, 16 pages.

*Primary Examiner* — Timothy Hannon
(74) *Attorney, Agent, or Firm* — Dierker & Kavanaugh, P.C.

(57) ABSTRACT

A locking differential assembly includes a differential case defining an axis of rotation. A first side gear is at a first end of the differential case. A second side gear is at a second end of the differential case. A stator is disposed at the first end. A solenoid is fixedly attached to the stator. The stator is selectably magnetically actuatable to translate an axial translation distance by the solenoid. A lock ring is selectably engagable with the first side gear to prevent the first side gear from rotating relative to the differential case. At least two relay pins are connected to the lock ring and in contact with the stator to space the lock ring at least a predetermined distance from the stator.

15 Claims, 9 Drawing Sheets

(51) Int. Cl.
    *B60K 23/04*     (2006.01)
    *B60K 17/16*     (2006.01)
    *F16D 27/118*     (2006.01)
    *F16H 48/08*     (2006.01)
    *F16H 48/40*     (2012.01)

(52) U.S. Cl.
    CPC .............. *F16H 48/08* (2013.01); *F16H 48/24* (2013.01); *F16H 48/40* (2013.01); *B60K 2023/046* (2013.01)

(56) References Cited

U.S. PATENT DOCUMENTS

| | | | |
|---|---|---|---|
| 2002/0155913 A1* | 10/2002 | Fusegi | B60K 23/04 475/150 |
| 2005/0070393 A1 | 3/2005 | DeGowske et al. | |
| 2007/0225106 A1* | 9/2007 | Veldman | F16H 48/34 475/231 |
| 2007/0270275 A1 | 11/2007 | Kleinhans et al. | |
| 2010/0056314 A1 | 3/2010 | Maruyama et al. | |
| 2014/0004988 A1 | 1/2014 | Yamanaka et al. | |
| 2014/0110211 A1* | 4/2014 | Andonian | F16H 48/24 192/69.8 |
| 2015/0133254 A1* | 5/2015 | Fox | F16H 48/08 475/150 |
| 2015/0204431 A1 | 7/2015 | Cochren et al. | |
| 2017/0254400 A1* | 9/2017 | Onitake | F16H 48/24 |

\* cited by examiner

LOCKING DIFFERENTIAL ASSEMBLY

CROSS-REFERENCE TO RELATED APPLICATIONS

This application claims the benefit of U.S. Provisional Application Ser. No. 62/397,205, filed Sep. 20, 2016, the contents of which is incorporated herein by reference.

BACKGROUND

A locking differential may have an additional capability compared to a conventional "open" automotive differential. A vehicle with a locking differential may experience increased use of traction at the drive wheels compared to a vehicle with an "open" differential. Use of traction may be increased by restricting each of the two drive wheels on an axle to the same rotational speed without regard to the available traction or the road path taken at each wheel. The locking differential causes both wheels on an axle to turn together as if on a common axle shaft.

An open differential, or unlocked locking differential, allows each wheel on an axle to rotate at different speeds. When a vehicle negotiates a turn, the wheel on the smaller (inner) radius rotates more slowly than the wheel on the larger (outer) radius. Without the unlocked or open differential, one of the tires may scuff in a turn. With an open differential, when one wheel of an axle is on a slippery road surface, the wheel on the slippery surface may tend to spin while the other wheel may not have enough torque applied to it to move the vehicle. For example, some vehicles with open differentials may be unable to climb a hill with wet ice under one of the wheels no matter how dry the pavement is under the other wheel (this may be known as a split-mu surface).

In contrast, a locked differential forces wheels on both sides of the same axle to rotate together at the same speed. Therefore, each wheel can apply as much torque as the wheel/road traction and the powertrain capacity will allow. In the example of the vehicle on the hill with the split-mu surface, a locked differential may allow the vehicle to climb the hill that is impossible for an otherwise identical vehicle to climb with an open differential. Locking differentials may also provide better traction that leads to improved vehicle performance under certain conditions, for example in drag racing, or snow plow operations.

Some vehicles have differentials that may be reconfigured from an unlocked state to a locked state. Such vehicles may be operated with the differential in the unlocked state for normal conditions, for example, to prevent tire scuffing in turns, and reconfigured for operation with a locked differential when wheel slippage is encountered.

SUMMARY

A locking differential assembly includes a differential case defining an axis of rotation. A first side gear is at a first end of the differential case. A second side gear is at a second end of the differential case. A stator is disposed at the first end. A solenoid is fixedly attached to the stator. The stator is selectably magnetically actuatable to translate an axial translation distance by the solenoid. A lock ring is selectably engagable with the first side gear to prevent the first side gear from rotating relative to the differential case. At least two relay pins are connected to the lock ring and in contact with the stator to space the lock ring at least a predetermined distance from the stator.

BRIEF DESCRIPTION OF THE DRAWINGS

Features of examples of the present disclosure will become apparent by reference to the following detailed description and drawings, in which like reference numerals correspond to the same or similar, though perhaps not identical, components. For the sake of brevity, reference numerals or features having a previously described function may or may not be described in connection with other drawings in which they appear.

DETAILED DESCRIPTION

The present disclosure relates generally to locking differentials, and more particularly to electronically controlled locking differentials used in vehicle drive axles. As used herein, an electronically controlled locking differential means a differential that changes between an unlocked state and a locked state in response to an electronic signal. In the locked state, both axle shafts connected to the differential rotate together in the same direction, at the same speed. The electronic signal may be automatically produced in response to a vehicle condition, for example, detection of wheel slippage. The electronic signal may also be produced in response to a demand from an operator, for example, an operator may press a button on a control panel of the vehicle.

Examples of the present disclosure may allow the differentials to operate at a higher torque than similarly sized existing locking differentials. The time to actuate the locking mechanism may also be reduced compared to existing electronic locking differentials. Further, the status indicator may provide a more satisfactory user experience by providing more detailed and accurate information regarding the operation of the electronically controlled locking differential system of the present disclosure.

Figure 1:
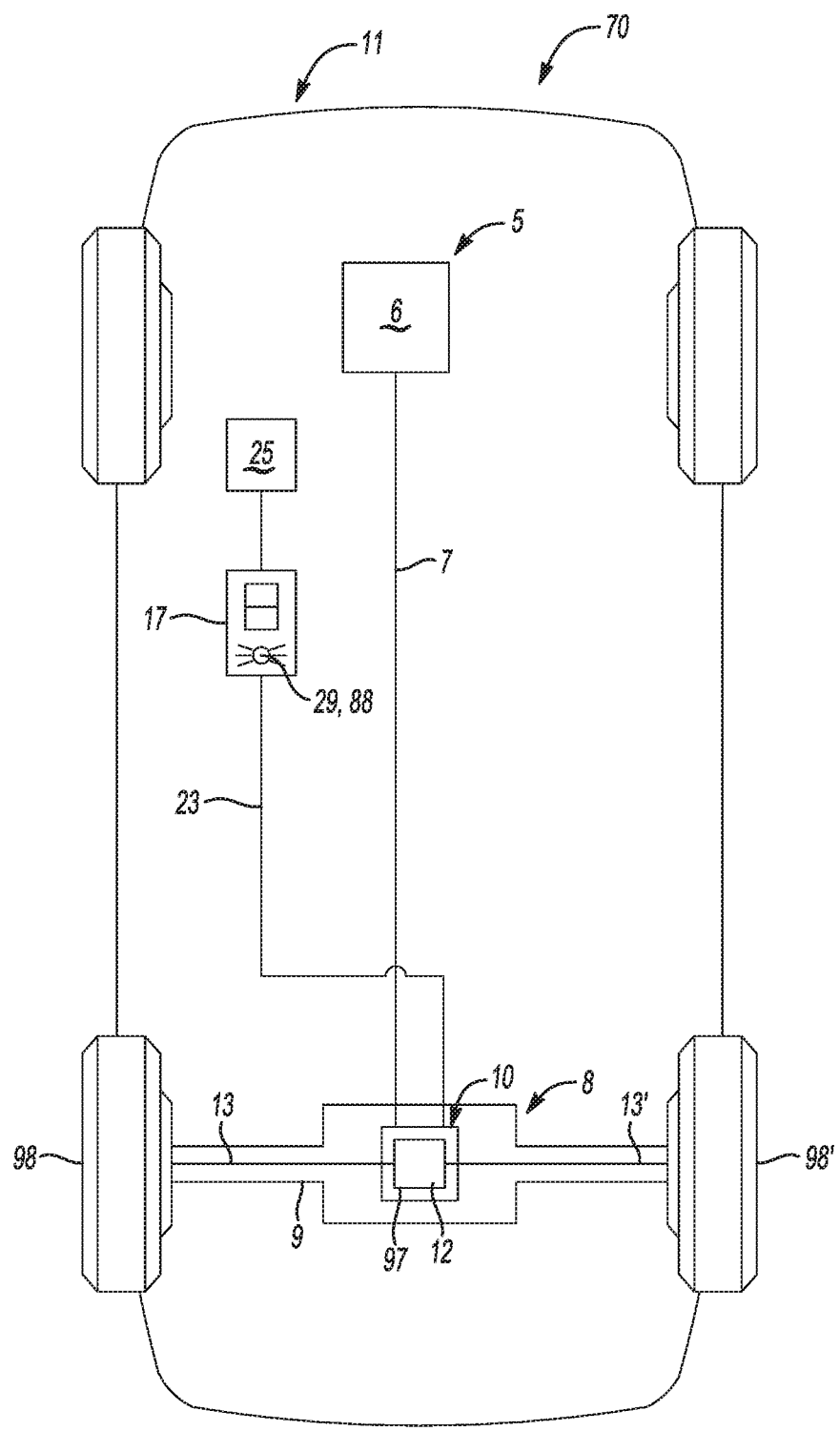
FIG. 1 is a schematic view of a vehicle with a locking differential system according to an example of the present disclosure.
Figure 2:
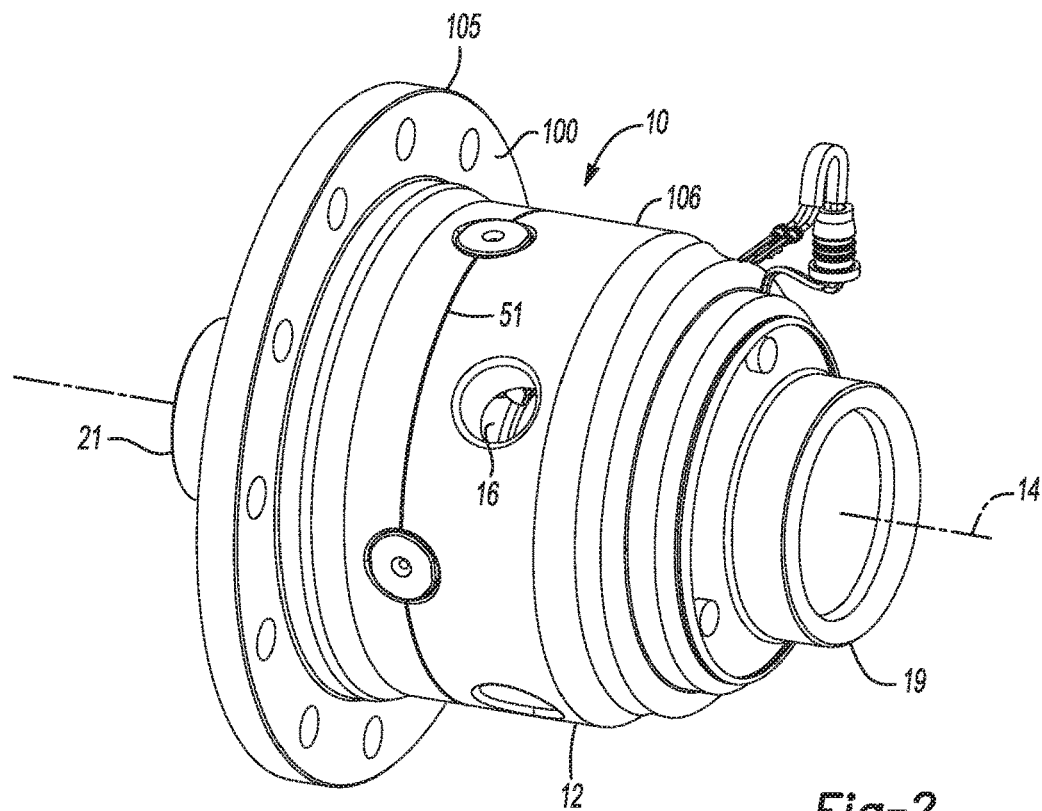
FIG. 2 is a perspective view of a locking differential according to an example of the present disclosure.

Referring to FIG. 1, a powertrain 5 for a vehicle 70 includes a motor 6, a propeller shaft 7 connected to the motor, and an axle assembly 8. The propeller shaft 7 is connected, for example, by gearing (not shown) to rotationally drive the axle shafts 13, 13' inside the axle housing 9. The axle assembly 8 includes the axle housing 9, a locking differential assembly 10 supported in axle housing 9 and the axle shafts 13, 13' respectively connected to first and second drive wheels 98 and 98'. A gearset 97 disposed within a differential case 12 transfers rotational power from the differential case 12 to the axle shafts 13, 13', and selectably allows relative rotation between the axle shafts 13 and 13'. Although the locking differential assembly 10 depicted in FIG. 1 is applied to a rear-wheel drive vehicle, the present disclosure may be used in transaxles for use in front-wheel drive vehicles, transfer cases for use in four-wheel drive vehicles or in any vehicle powertrain.

Referring to FIGS. 2, 3, 4A and 4B together, an example of the present disclosure is depicted including a locking differential assembly 10. The locking differential assembly 10 has a differential case 12 defining an axis of rotation 14 and a gear chamber 16. The differential case 12 rotates in the axle housing 9 (see FIG. 1) about the axis of rotation 14. A first side gear 18 is disposed at a first end 19 of the differential case 12 for selectable relative rotation thereto. A second side gear 20 is disposed at a second end 21 of the differential case 12 opposite the first end 19 for selectable rotation relative to the differential case 12.

The first side gear 18 has side gear dogs 22 defined on a back face 24 of the first side gear 18. The back face 24 of the first side gear 18 is opposite to a gear tooth face 66 of the first side gear 18. At least two pinion gears 26 are rotatably supported in the gear chamber 16. Each of the at least two pinion gears 26 is in meshing engagement with the first side gear 18 and the second side gear 20.

Figure 4A:
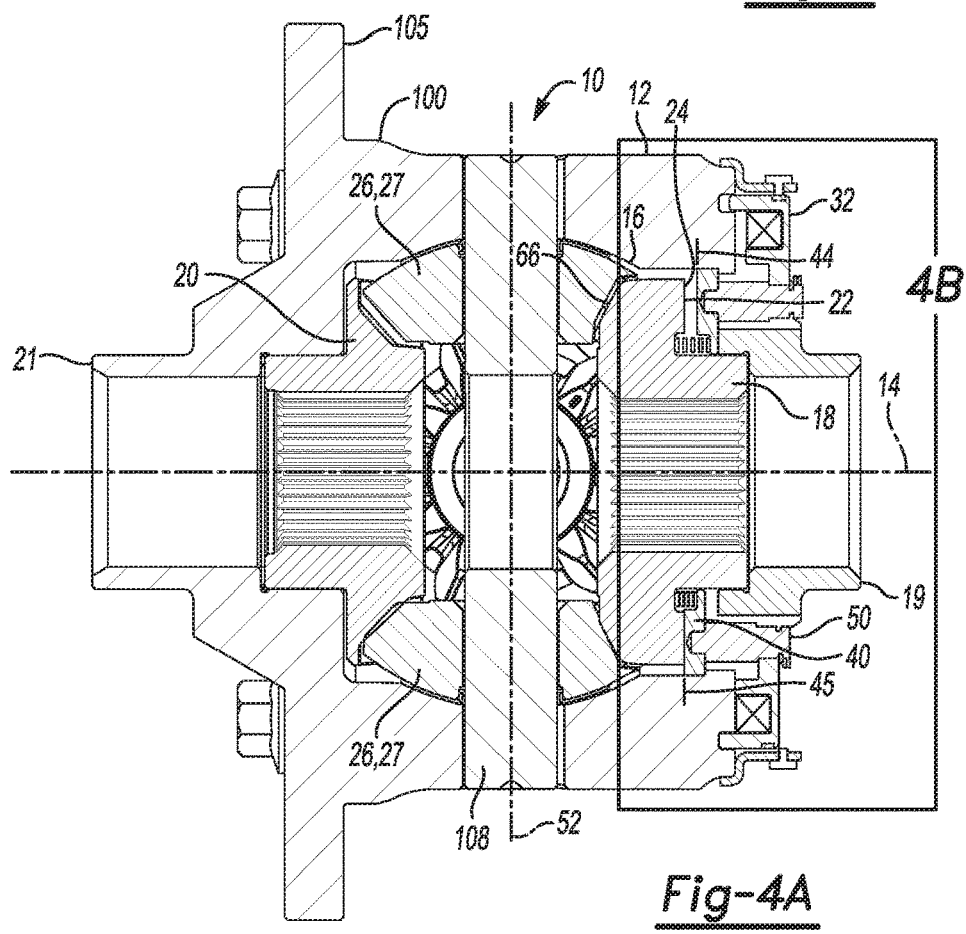
FIG. 4A is a cross-sectional side view of the locking differential depicted in FIG. 2.
Figure 4B:
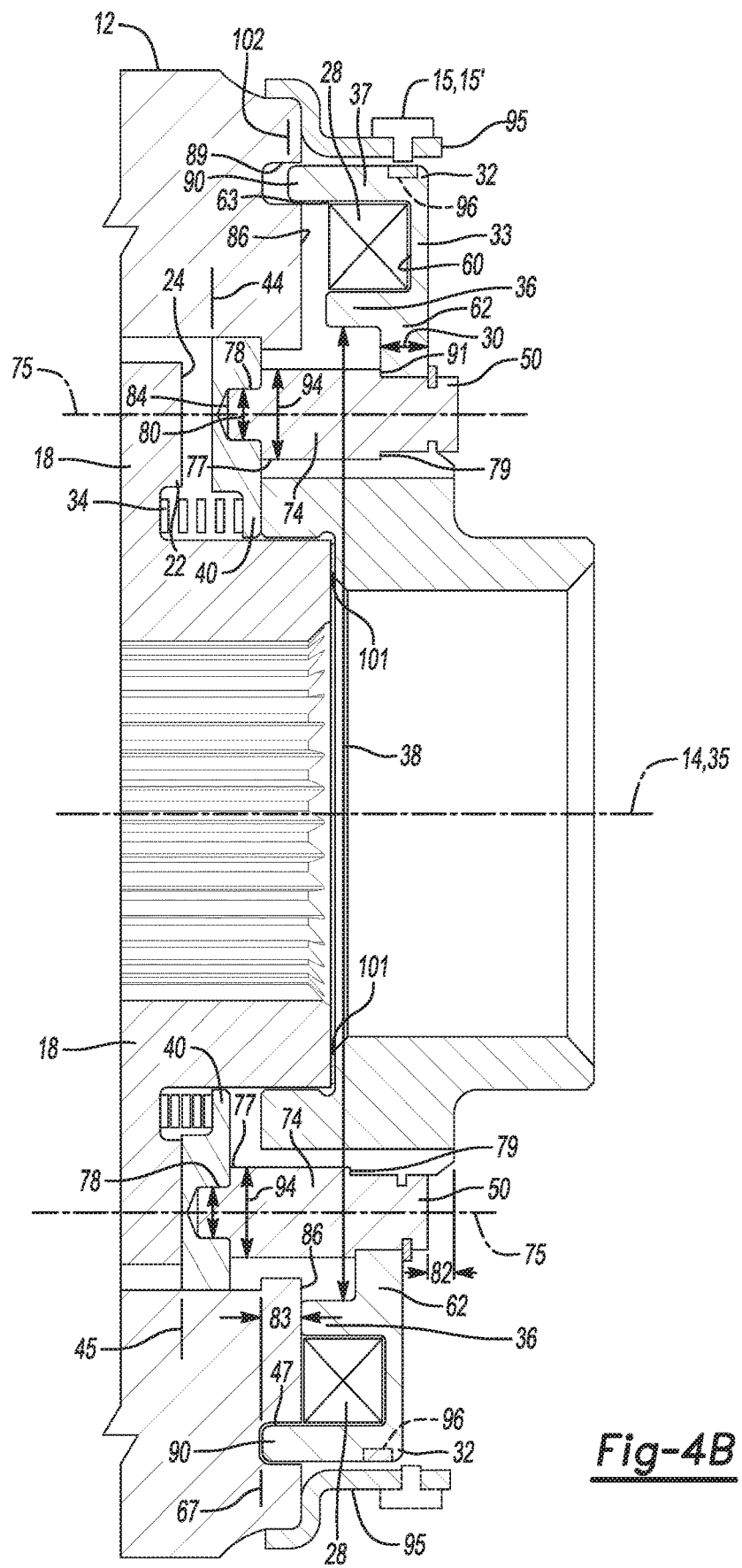
FIG. 4B is a detail cross-sectional side view of the portion of the locking differential indicated in FIG. 4A.

The locking differential assembly 10 includes a stator 32, disposed at the first end 19 of the differential case 12. A solenoid 28 is retained in an annular solenoid cavity 60 defined by a stator 32. The solenoid 28 may be fixedly attached to the stator 32 by, for example, an adhesive or fasteners. The stator 32 is formed from a ferromagnetic material. The differential case 12 is rotatable relative to the stator 32 about the axis of rotation 14. As depicted in FIG. 4A and FIG. 4B, the stator 32 has an annular wall 33 with a longitudinal wall axis 35 coaxial with the axis of rotation 14. A first stator annular flange 36 extends parallel to the longitudinal wall axis 35 from the annular wall 33 at a first inner diameter 38 of the first stator annular flange 36. The first stator annular flange 36, the annular wall 33, and the second stator annular flange 37 define the annular solenoid cavity 60. The annular solenoid cavity 60 has an open end 63 distal to the annular wall 33.

Although FIG. 4A and FIG. 4B depict the first stator annular flange 36 extending parallel to the longitudinal wall axis 35, the angle that the annular flange 36 makes with the annular wall 33 may deviate from 90 degrees. For example, the angle may be 45 degrees such that the annular solenoid cavity 60 is wider at the open end 63 than at the annular wall 33. The angle between the first stator annular flange 36 and the annular wall 33 may be any angle so long as the annular solenoid cavity 60 is defined by the first stator annular flange 36, the annular wall 33, and the second stator annular flange 37.

The second stator annular flange 37 extends from the annular wall 33 farther than the first stator annular flange 36 by a cylindrical extension length 83 greater than the axial translation distance 82. The second stator annular flange 37 is spaced radially outwardly from the first stator annular flange 36 and may be parallel to the first stator annular flange 36. Although FIGS. 4A and 4B depict the annular solenoid cavity 60 as having a substantially rectangular cross section, the surfaces may be rounded or canted in examples of the present disclosure. In an example, the solenoid 28 can be wound on a separate bobbin (not shown) and placed into the annular solenoid cavity 60 via the open end 63. In another example, a bobbinless solenoid can be used.

Figure 3:
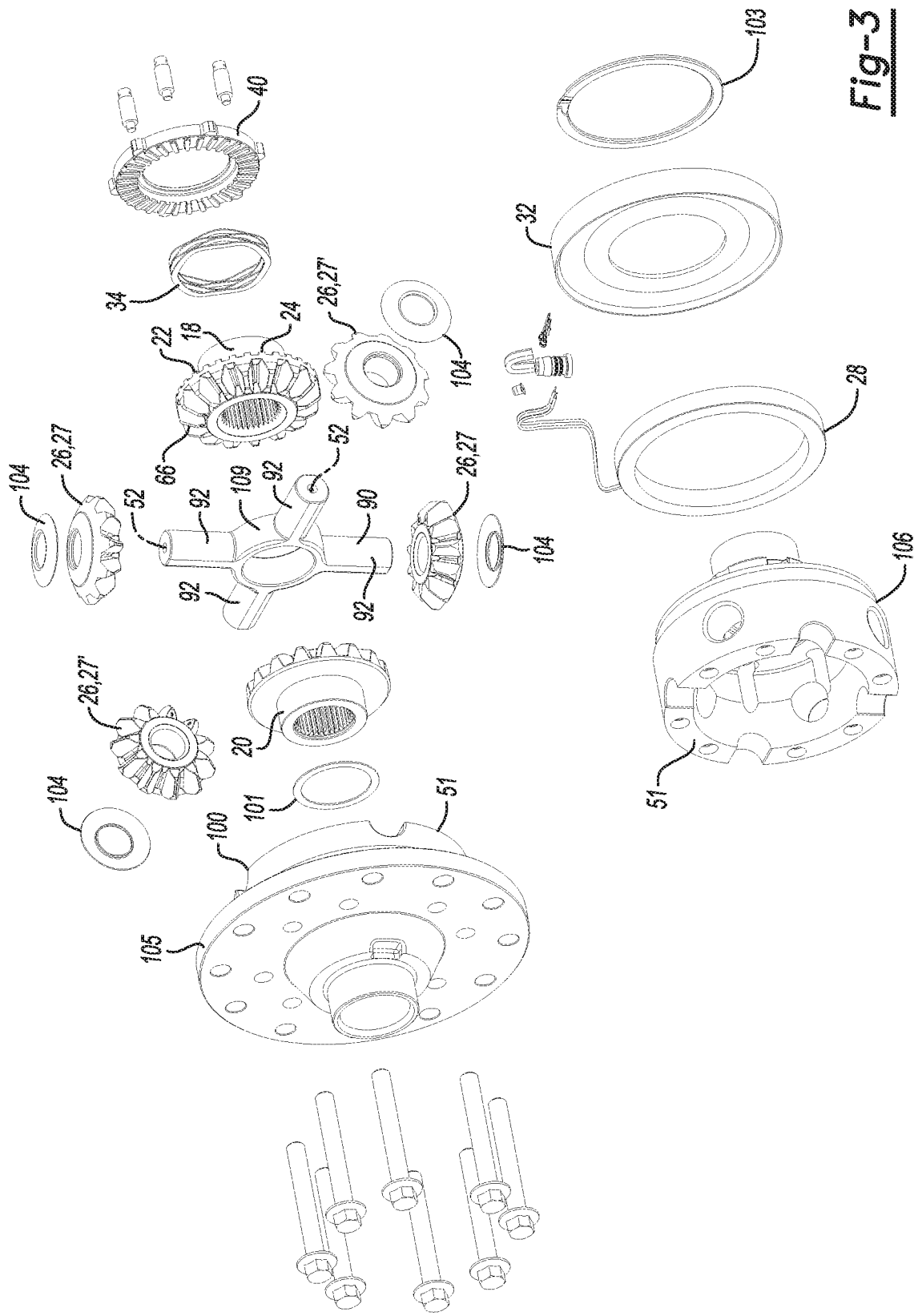
FIG. 3 is an exploded view of the locking differential depicted in FIG. 2.
Figure 6:
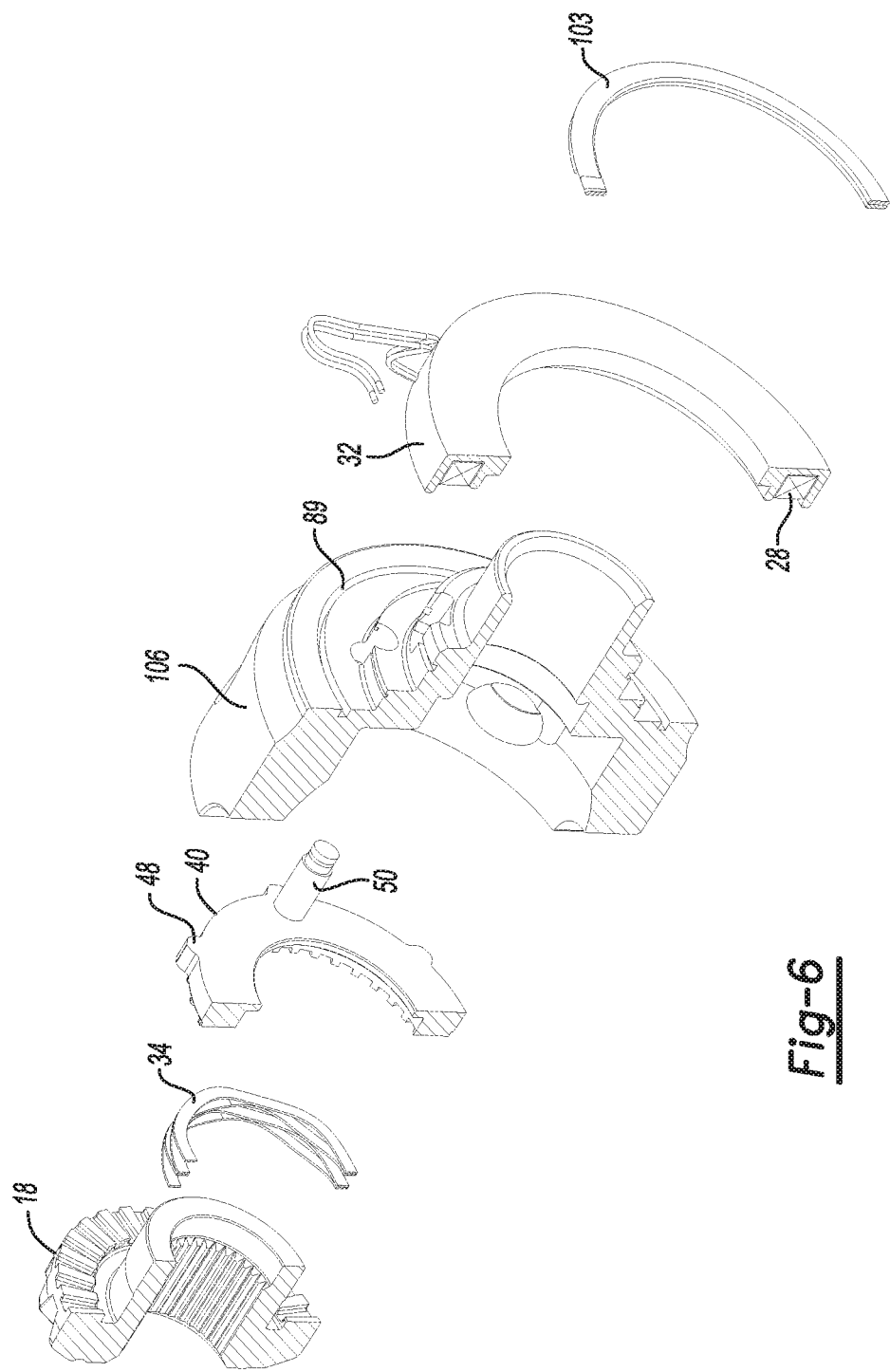
FIG. 6 is a perspective cross sectional exploded view of the locking components of the example depicted in FIG. 2.

FIG. 3 and FIG. 6 depict a spring 34 disposed between the first side gear 18 and the lock ring 40 to bias the lock ring 40 toward the disengaged position 44 shown at the top half of FIG. 4A and FIG. 4B. The bottom half of FIG. 4A and FIG. 4B depicts the lock ring 40 in the engaged position 45. In the example depicted in FIG. 3, the differential case 12 includes two pieces with a parting line 51 at the cross-shaft centers 52. One of the two pieces of the differential case 12 is a flanged piece 100 with an attachment flange 105 for attaching a ring gear (not shown). The other of the two pieces of the differential case 12 is a second piece 106 upon which the stator 32 and lock ring 40 are mounted. A side gear thrust washer 101 is disposed between the flanged piece 100 and the second side gear 20. Thrust washers 104 are disposed between the pinion gears 26, 26' and the differential case 12.

Referring to FIGS. 4A, 4B and 6, in examples of the present disclosure, the stator 32 is selectably magnetically actuated to translate an axial translation distance 82 by activation of the solenoid 28. A stator central annular flange 62 extends radially inward from the first stator annular flange 36.

The second stator annular flange 37 extends from the annular wall 33 farther than the first stator annular flange 36 by a cylindrical extension length 83 greater than the axial translation distance 82. (See, e.g. FIG. 4B.) The differential case 12 has an annular end surface 86. The annular end surface 86 is magnetically responsive. A stator reception groove 89 is defined in the annular end surface 86 of the differential case 12 to receive a penetrating portion 90 of the second stator annular flange 37. A clearance 47 between the stator reception groove 89 and the second stator annular flange 37 prevents contact between the differential case 12 and the second stator annular flange 37 in a stator engaged position 67 and a stator disengaged position 102. The clearance 47 between the stator reception groove 89 and the second stator annular flange 37 is small enough to provide mechanical clearance, yet allow the magnetic flux to efficiently flow through the second stator annular flange 37 across the clearance 47 and into the stator 32 through the stator reception groove 89. In examples of the present disclosure in which the second stator annular flange 37 penetrates the stator reception groove 89, the magnetic attraction of the stator 32 to the differential case 12 is stronger than the magnetic attraction would be without the penetration of the annular flange 37 into the stator reception groove 89. The stronger magnetic attraction allows more efficient use of the electrical energy used to energize the solenoid 28. As an example of more efficient use of the electrical energy, it takes less current to generate a magnetic attraction strong enough to overcome the biasing force of the spring 34 to actuate the stator 32 to translate the axial translation distance 82 (FIG. 4B) along the axis of rotation 14. In other words, it takes less electrical energy to cause the locking differential assembly to lock. Another aspect of more efficient use of electrical energy is that the same amount of current yields a stronger magnetic attraction to cause faster lockups of the locking differential assembly 10.

The stator engaged position 67 is a first axial position of the stator 32 that corresponds to the engaged position 45 of the lock ring 40. The stator disengaged position 102 is a second axial position of the stator 32 that corresponds to the disengaged position 44 of the lock ring 40. The first stator annular flange 36 contacts the annular end surface 86 of the differential case 12 when the stator 32 is in the stator engaged position 67. The stator 32 is depicted in the stator engaged position 67 in the bottom half of FIG. 4A, and the bottom half of FIG. 4B. The stator 32 is depicted in the stator disengaged position 102 in the top half of FIG. 4A, and the top half of FIG. 4B.

In an example, the at least two relay pins 50 contact the stator central annular flange 62 to drive the lock ring 40 toward engagement with the first side gear 18 when the solenoid 28 is energized. As used herein, the term "energized" means that electric current flows through the solenoid 28. The at least two relay pins 50 may be connected to the lock ring 40 and in contact with the stator 32 to space the lock ring 40 at least a predetermined distance from the stator 32. Therefore, the lock ring 40 and the stator 32 are rigidly attached together to move together as a single rigid body. In examples, the predetermined distance between the lock ring 40 and the stator 32 may be from about 15 mm to about 100 mm.

In examples of the present disclosure, the stator 32 is selectably magnetically actuatable to translate an axial translation distance 82 (FIG. 4B) along the axis of rotation 14. In an example, the axial translation distance 82 may be from about 1 mm to about 12 mm. The axial translation distance 82 may be sized to move the complementary dogs 42 of the lock ring 40 from being completely disengaged from the the side gear dogs 22 to full engagement between the complementary dogs 42 and the side gear dogs 22. When the complementary dogs 42 and the side gear dogs 22 are completely disengaged, there is no contact between the complementary dogs 42 and the side gear dogs 22. The solenoid 28 actuates the stator 32 when the solenoid 28 is energized. The spring 34 biases the lock ring 40, toward the disengaged position 44; however, the magnetic attraction of stator 32 to the annular end surface 86 of the differential case 12 caused by the solenoid 28, when energized, is stronger than the biasing force of the spring 34. When the solenoid 28 is energized, the magnetic attraction of the stator 32 to the annular end surface 86 of the differential case 12 overcomes the biasing force of the spring and actuates the stator 32 to translate the axial translation distance 82 (FIG. 4B) along the axis of rotation 14.

In some existing locking differential systems, the stator remains at a fixed distance from the differential case along the axis of rotation. A plunger is actuated by a solenoid connected to the stator to move the plunger axially along the axis of rotation relative to the differential case (and the stator, since the differential case and the stator have a fixed axial relationship). The plunger selectably engages a locking mechanism via a lock ring connected to the plunger, a friction clutch pack, or by directly engaging a side gear with the plunger.

Examples of the present disclosure have no such plunger. The stator 32 of the present disclosure is directly, magnetically attracted to the differential case 12 when the solenoid 28 is energized. The stator 32 translates axially along the axis of rotation 14.

As depicted in FIG. 4B, FIG. 5A, FIG. 5C and FIG. 6, at least two relay pins 50 each include a cylindrical rod portion 74 having a post end 77 and a stator end 79 opposite the post end 77, the cylindrical rod portion 74 defines a longitudinal rod axis 75 at a center of the cylindrical rod portion 74. The center of the cylindrical rod portion 74 is the axial center of the cylindrical rod portion 74. The relay pins 50 each have a shoulder 91 defined on the cylindrical rod portion 74 to support the stator central annular flange 62. Each relay pin 50 has a relay pin neck 93 having a neck diameter 68 smaller than a rod portion diameter 94 of the cylindrical rod portion 74 defined at the stator end 79. A retention ring groove 73 is defined in the relay pin neck 93. The retention ring groove 73 is spaced from the shoulder 91 by about a flange thickness 30 of the stator central annular flange 62. The relay pins 50 each have a post 78 having a post diameter 80 smaller than the rod portion diameter 94 of the cylindrical rod portion 74 defined at the post end 77. The post 78 is concentric with the cylindrical rod portion 74. The post 78 extends from the post end 77 of the cylindrical rod portion 74 to engage a respective relay pin attachment bore 84 defined in the lock ring 40.

Referring now to FIGS. 4A, 4B, 5A, 5B, 5C, and 6 together, in examples of the present disclosure, the locking differential assembly 10 has a lock ring 40. The lock ring 40 includes complementary dogs 42 defined around an engagement face 43 of the lock ring 40. The complementary dogs 42 are selectably engagable with the side gear dogs 22 by translating the lock ring 40 along the axis of rotation 14 from a disengaged position 44 to an engaged position 45. The lock ring 40 has a plurality of lugs 46 defined on an outside surface 110 of the lock ring 40. Each lug 48 is to slide in a respective complementary slot 49 defined in the differential case 12 to guide the translation of the lock ring 40 between the engaged position 45 and the disengaged position 44. (See FIG. 5B.) The fit of the plurality of lugs 46 in the respective complementary slots 49 also prevents rotation of the lock ring 40 relative to the differential case 12.

The top half of FIG. 4A and the top half of FIG. 4B depict an example of the present disclosure with the lock ring 40 in the disengaged position 44. The bottom half of FIG. 4A and the bottom half of FIG. 4B depict the lock ring 40 in the engaged position 45. In examples of the present disclosure, the first side gear 18 is substantially prevented from rotating relative to the differential case 12 when the lock ring 40 is in the engaged position 45. The first side gear 18 is free to rotate relative to the differential case 12 when the lock ring 40 is in the disengaged position 44. The lock ring 40 has a lock ring thickness 41 (FIG. 5A) parallel to the axis of rotation 14.

Figure 5A:
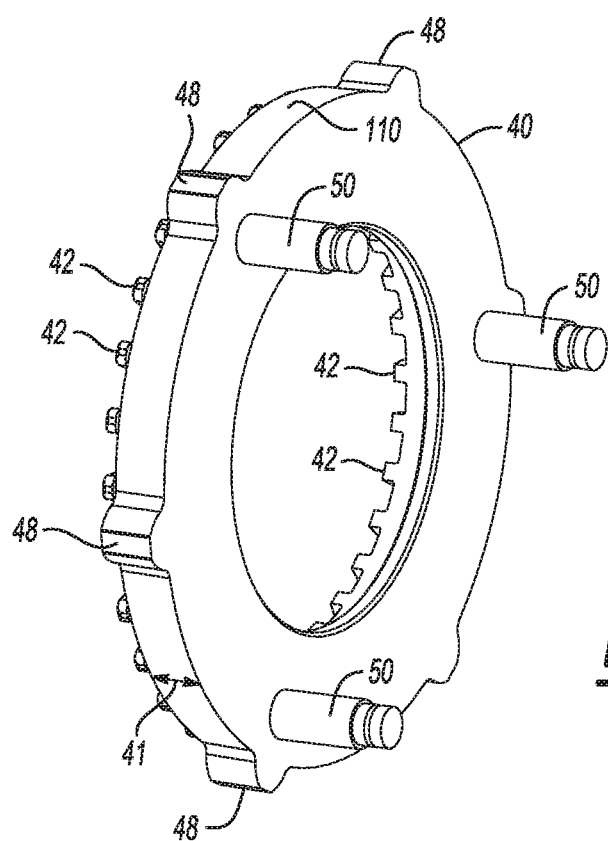
FIG. 5A is right perspective view of an example of a lock ring with relay pins according to the present disclosure.
Figure 5B:
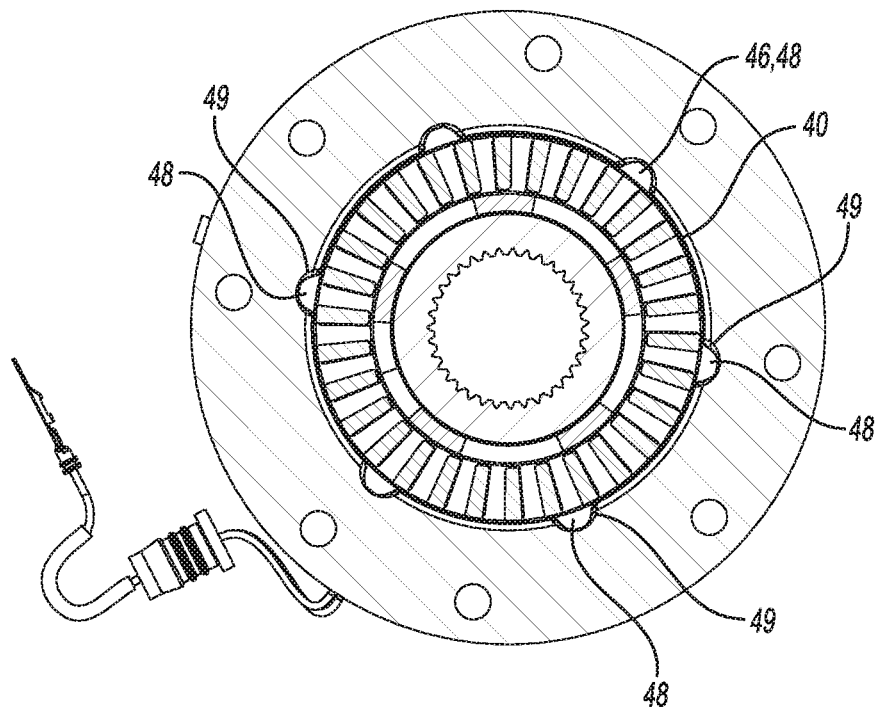
FIG. 5B is a cross-sectional end view depicting an example of a lock ring engaged in a differential case.
Figure 5C:
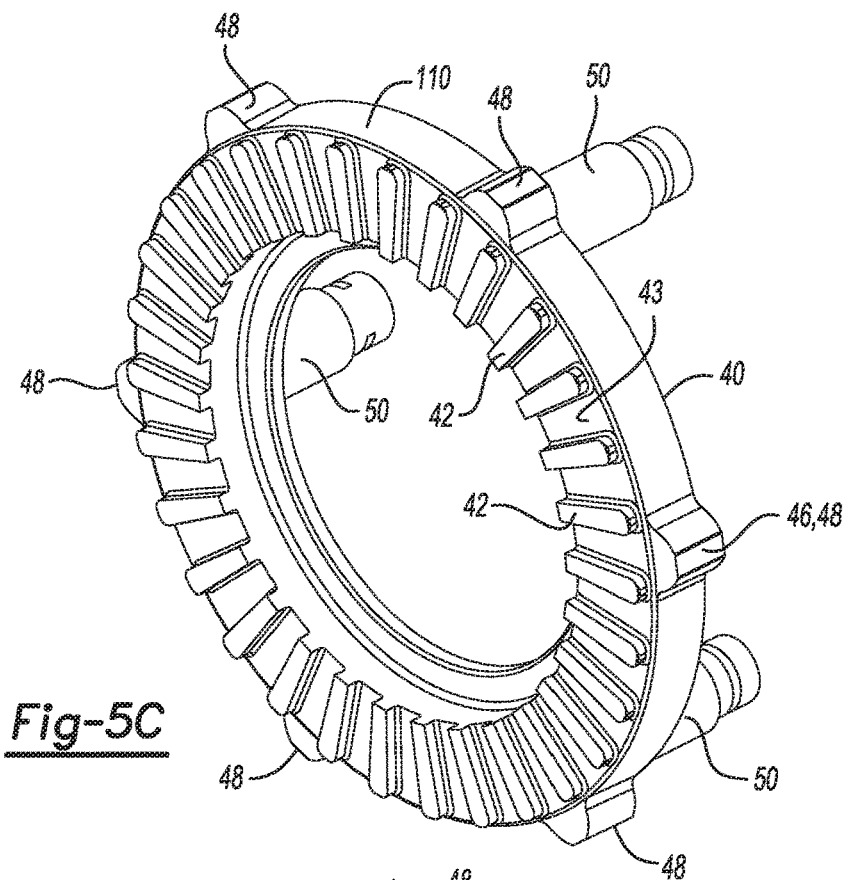
FIG. 5C is a left perspective view of the example of the lock ring with relay pins depicted in FIG. 5A.
Figure 5D:
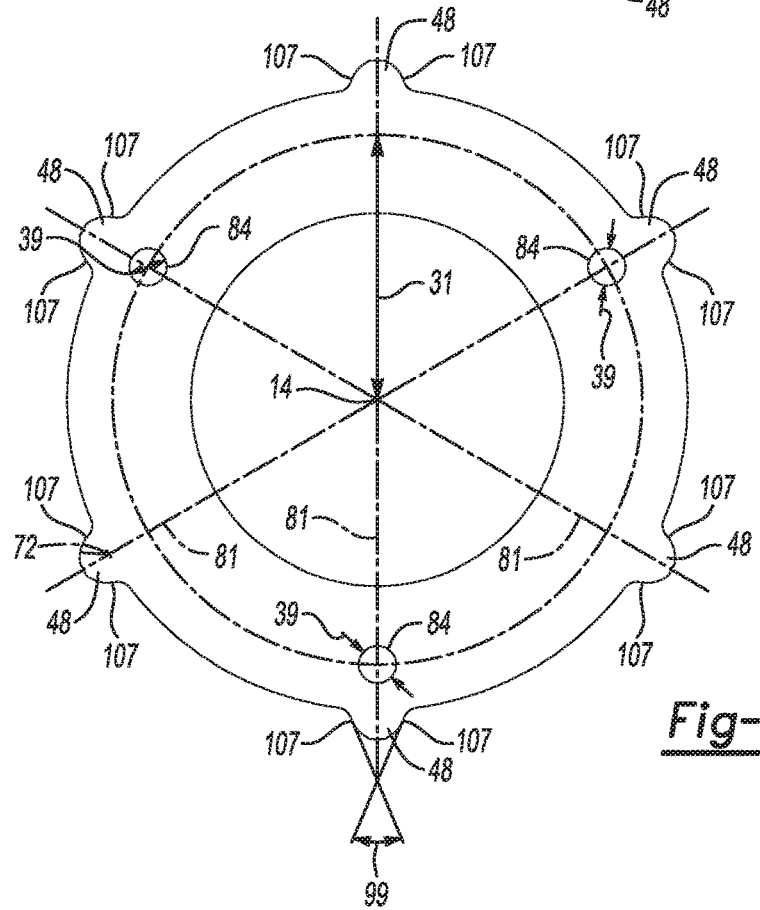
FIG. 5D is an end view of the lock ring depicted in FIG. 5A.

The lock ring 40 defines a quantity of relay pin attachment bores 84 equal to a quantity of the relay pins 50 The relay pin attachment bores 84 are centered on a radial line at a predetermined radius 31 from the axis of rotation 14 through a center of a respective lug 48 (FIG. 5D). Each relay pin 50 is retained in the respective relay pin attachment bore 84. In an example, the plurality of lugs 46 has a quantity of six lugs 48, and the quantity of relay pins 50 is three. It is to be understood that, as used herein, the word "quantity" refers to the total count of like objects, and not a subset of the total count. For example, the plurality of lugs 46 in FIG. 5D has a quantity of six lugs 48.

Figure 5E:
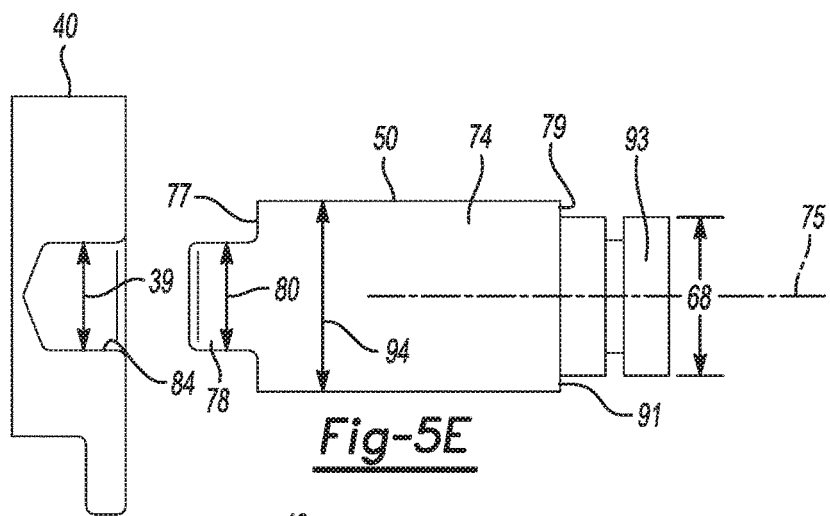
FIG. 5E is a cross-sectional exploded view of an example of the locking ring and a relay pin with the relay pin secured in the locking ring by a press fit.

As depicted in FIG. 5E, in an example, a post diameter 80 of the post 78 of each relay pin 50 is larger than a bore diameter 39 of each relay pin attachment bore 84 to form a press fit between the post 78 of each relay pin 50 and the respective relay pin attachment bore 84. In an example, there is an ANSI B4.2-1978 H7/s6 medium drive fit between the post 78 of each relay pin 50 and the respective relay pin attachment bore 84.

Figure 5F:
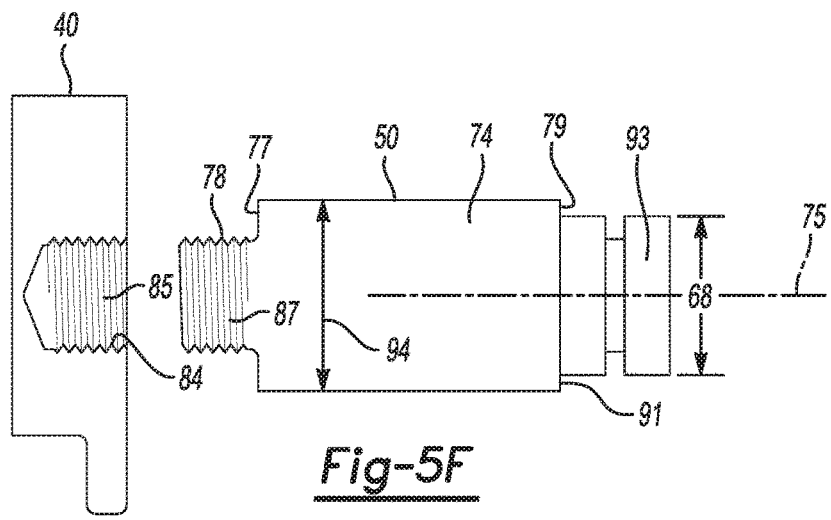
FIG. 5F is a cross-sectional exploded view of an example of the locking ring and a relay pin with the relay pin secured in the locking ring by screw threads.

As depicted in FIG. 5F, in an example, the post 78 of each relay pin 50 has a first screw thread 87 defined thereon. Each relay pin attachment bore 84 can have a second screw thread 85 complementary to the first screw thread 87 defined therein. Each relay pin 50 can be threadingly fastened to the lock ring 40 via engagement of the first screw thread 87 with the second screw thread 85.

Each lug 48 may have two opposed faces 107 symmetrically arranged about a radial line 81 perpendicular to the axis of rotation 14. The two opposed faces may each be arcs of a circle having a center 72 on the radial line 81 from the axis of rotation 14 through the center of the respective lug 48. In examples, an angle 99 between the two opposed faces can be from about 28 degrees to about 32 degrees. In examples having the two opposed faces 107 being arcs of a circle, the angle 99 between the two opposed faces is defined herein as the angle between the tangents to the arcs at the respective midpoints of the arcs.

The locking differential system 11 may include a stator position sensor 15 to determine a state of the lock ring 40 by detecting the position of the stator 32. As shown in FIG. 4B, in an example, the stator position sensor 15 may be a non-contacting position sensor 15' disposed on an anti-rotation bracket 95 connected to the differential case 12. In examples of the present disclosure, the non-contacting position sensor 15' may use any non-contacting position sensor technology. For example, non-contacting position sensors based on magnetostriction, magnetoresistance, Hall-Effect, or other magnetic sensing technologies may be included in the locking differential system 11 according to the present disclosure. Further, non-contacting position sensors based on optical, infrared, or fluid pressure sensing may also be used according to the present disclosure. In the example, the non-contacting position sensor 15' detects an axial position of the stator 32 or a target 96 affixed to the stator 32. The target 96 may be magnetically responsive to be detectable by the non-contacting position sensor 15' if the sensor uses magnetic sensing technology.

Figure 4C:
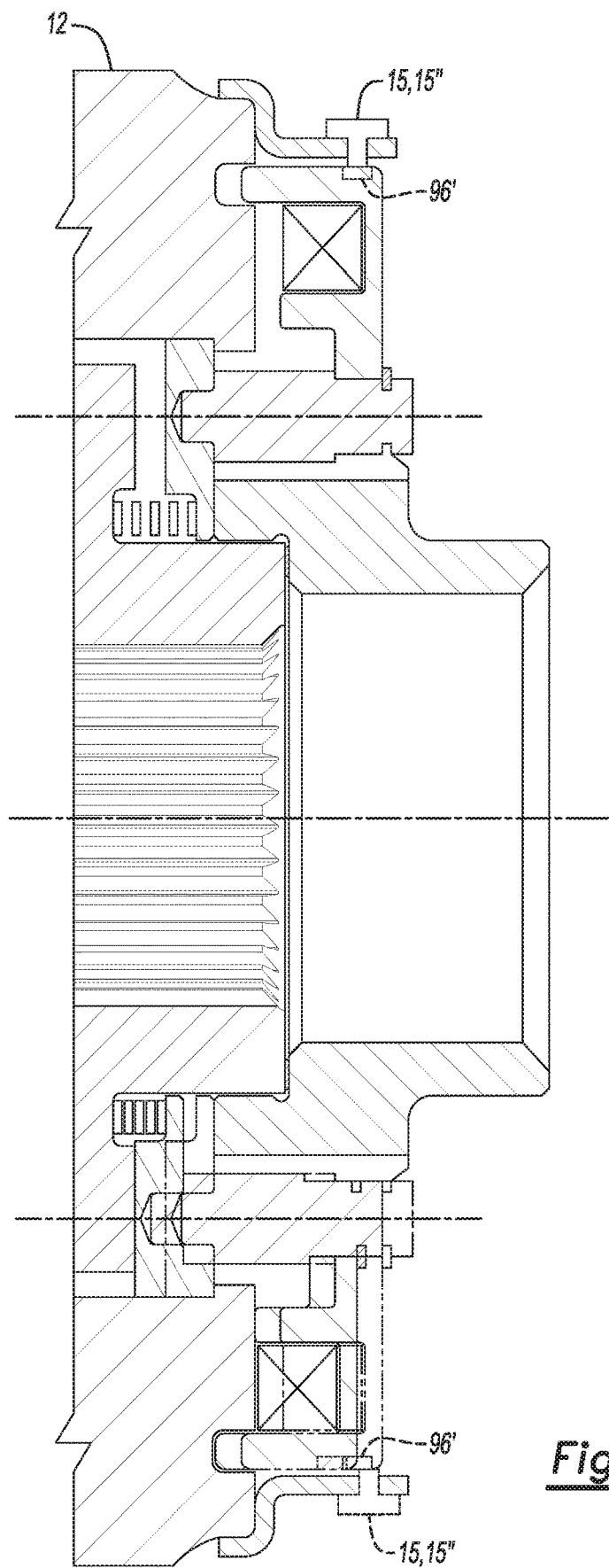
FIG. 4C is a detail cross-sectional side view of the portion of the locking differential indicated in FIG. 4A, similar to FIG. 4B except the stator position sensor is a contact switch in FIG. 4C.

In an example depicted in FIG. 4C, the stator position sensor 15 may be a contact switch 15" disposed on an anti-rotation bracket 95 connected to the differential case 12. The contact switch 15" is to detect an axial position of the stator 32 or a target 96' affixed to the stator 32. Since the stator position sensor 15 is a contact switch 15", it is not necessary for the target 96' to be magnetically responsive. The target 96' may be magnetically responsive or not magnetically responsive. The contact switch 15" has an open state and a closed state. The contact switch 15" opens an electrical circuit in the open state; and the contact switch 15" closes the electrical circuit in the closed state. The contact switch 15" is mechanically switched from the open state to the closed state by contact with the stator 32 or a target 96' attached to the stator 32. In an example, the target 96' may be a mechanical actuating feature, e.g. a cam surface, notch, lever, bump or any other structural feature capable of mechanically actuating the contact switch 15".

Figure 7:
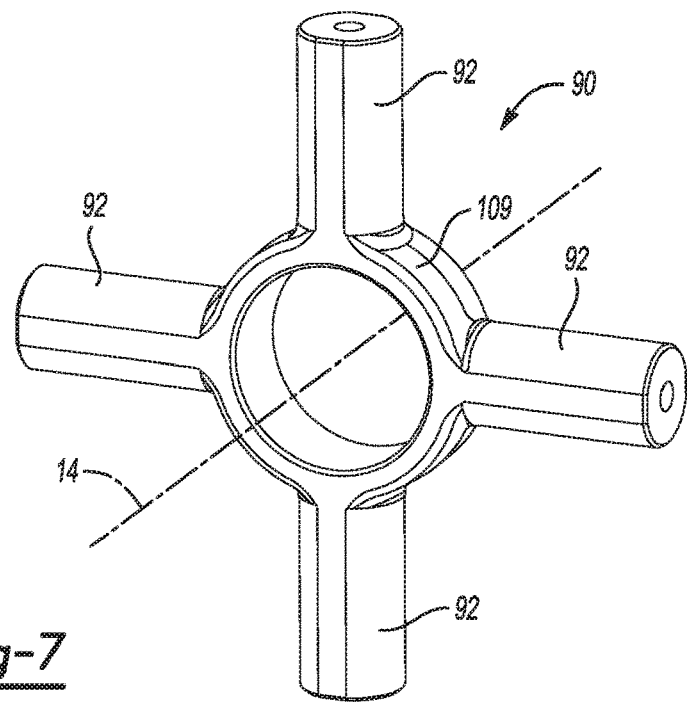
FIG. 7 is a perspective view of an example of a single-piece cross-shaft according to the present disclosure.

Examples of the present disclosure may have a cross-shaft 108 disposed perpendicularly to the axis of rotation 14 of the differential case 12 to support an opposed pair 27 of the at least two pinion gears 26 for rotation of the opposed pair 27 of the at least two pinion gears 26 on the cross-shaft 108. Referring to FIGS. 3 and 7, in examples of the present disclosure with a 4-pinion differential, the differential assembly 10 may include a plurality of stub shafts 92. Each stub shaft 92 can be equally spaced around an annular yoke 109. The plurality of stub shafts 92 can be disposed perpendicularly to the axis of rotation 14 of the differential case 12. The plurality of stub shafts 92 and the yoke 109 can compose a single forging. The plurality of stub shafts 92 support an opposed pair 27 of the at least two pinion gears 26 and another opposed pair 27' of the at least two pinion gears 26 for rotation of the four pinion gears 26 on the respective stub shafts 92.

Returning back to FIG. 1, an electrical switch 17 may be disposed on the vehicle 70 to selectably close a circuit 23 to provide electrical power to the solenoid 28. The switch 17 shown in FIG. 1 is a rocker switch, however any switch capable of controlling the flow of power through the solenoid 28 may be used. The switch 17 may be a low current switch that controls a relay or transistor that directly controls power through the solenoid 28. An electronic status indicator 29 may be disposed in the vehicle 70. An electronic driver circuit 25 may be disposed on the vehicle 70 to power the electronic status indicator 29 to indicate a status of the locking differential system 11. In an example, the status may include at least three states. For example, the electronic status indicator 29 may be a selectably illuminated indicator 88, and the status may be indicated by a flash code. To illustrate, the selectably illuminated indicator 88 may include a light emitting diode, incandescent lamp, fluorescent lamp, or other selectably illuminatable light source.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

In describing and claiming the examples disclosed herein, the singular forms "a", "an", and "the" include plural referents unless the context clearly dictates otherwise.

It is to be understood that the ranges provided herein include the stated range and any value or sub-range within the stated range. For example, a range from about 28 degrees to about 32 degrees should be interpreted to include not only the explicitly recited limits of from about 28 degrees to about 32 degrees, but also to include individual values, such as 29 degrees, 30.4 degrees, 31 degrees, etc., and sub-ranges, such as from about 29 degrees to about 31 degrees, etc. Furthermore, when "about" is utilized to describe a value, this is meant to encompass minor variations (up to +/−10%) from the stated value.

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

While several examples have been described in detail, it is to be understood that the disclosed examples may be modified. Therefore, the foregoing description is to be considered non-limiting.

What is claimed is:

1. A locking differential assembly, comprising:
a differential case defining an axis of rotation;
a first side gear disposed at a first end of the differential case for selectable relative rotation thereto;
a second side gear disposed at a second end of the differential case opposite the first end for selectable rotation relative to the differential case;
a stator disposed at the first end;
a solenoid fixedly attached to the stator, the stator selectably magnetically actuatable to translate an axial translation distance by the solenoid;
a lock ring selectably engagable with the first side gear to selectably prevent the first side gear from rotating relative to the differential case; and
at least two relay pins each connected to the lock ring and in contact with the stator to space the lock ring at least a predetermined distance from the stator.

2. The locking differential assembly as defined in claim 1, further comprising:
side gear dogs defined on a back face of the first side gear, the back face opposite to a gear tooth face of the first side gear;
complementary dogs defined on an engagement face of the lock ring, the complementary dogs selectably engagable with the side gear dogs by translating the lock ring along the axis of rotation from a disengaged position to an engaged position;
a spring disposed between the first side gear and the lock ring to bias the lock ring toward the disengaged position; and
a plurality of lugs defined on an outside surface of the lock ring, each lug to slide in a respective complementary slot defined in the differential case to guide the translating of the lock ring between the engaged position and the disengaged position and to prevent rotation of the lock ring relative to the differential case;
wherein the first side gear is substantially prevented from rotating relative to the differential case when the lock ring is in the engaged position, and the first side gear is free to rotate relative to the differential case when the lock ring is in the disengaged position and wherein the lock ring has a lock ring thickness parallel to the axis of rotation.

3. The locking differential assembly as defined in claim 2 wherein:
each lug has two opposed faces symmetrically arranged about a radial line perpendicular to the axis of rotation; and
an angle between the two opposed faces is from about 28 degrees to about 32 degrees.

4. The locking differential assembly as defined in claim 3 wherein the plurality of lugs has a quantity of six lugs.

5. The locking differential assembly as defined in claim 1, the stator comprising:
an annular wall having a longitudinal wall axis coaxial with the axis of rotation;
a first stator annular flange extending from the annular wall at a first inner diameter;
a second stator annular flange extending from the annular wall spaced radially outwardly from the first stator annular flange; and
a stator central annular flange extending radially inward from the first stator annular flange,
wherein:
the first stator annular flange, the annular wall and the second stator annular flange define an annular solenoid cavity;
the stator is formed from a ferromagnetic material;
the differential case is rotatable relative to the stator about the axis of rotation; and
the at least two relay pins contact the stator central annular flange to drive the lock ring toward engagement with the first side gear when the solenoid is energized.

6. The locking differential assembly as defined in claim 5 wherein:
the second stator annular flange extends from the annular wall farther than the first stator annular flange by a cylindrical extension length greater than the axial translation distance;
the differential case has an annular end surface;
the annular end surface is magnetically responsive;
a stator reception groove is defined in the annular end surface of the differential case to receive a penetrating portion of the second stator annular flange;
a clearance between the stator reception groove and the second stator annular flange prevents contact between the differential case and the second stator annular flange in a stator engaged position and a stator disengaged position;
the stator engaged position is a first axial position of the stator that corresponds to the engaged position of the lock ring;
the stator disengaged position is a second axial position of the stator that corresponds to the disengaged position of the lock ring; and
the first stator annular flange contacts the annular end surface of the differential case when the stator is in the stator engaged position.

7. The locking differential assembly as defined in claim 5, the at least two relay pins each comprising:
a cylindrical rod portion having a post end and a stator end opposite the post end, the cylindrical rod portion defining a longitudinal rod axis at a center of the cylindrical rod portion;
a shoulder defined on the cylindrical rod portion to support the stator central annular flange;
a relay pin neck having a neck diameter smaller than a rod portion diameter of the cylindrical rod portion, the relay pin neck defined at the stator end;
a retention ring groove defined in the relay pin neck, the retention ring groove spaced from the shoulder by about a flange thickness of the stator central annular flange; and
a post having a post diameter smaller than the cylindrical rod portion defined at the post end, the post being concentric with the cylindrical rod portion.

8. The locking differential assembly as defined in claim 7 wherein the lock ring defines a quantity of relay pin attachment bores equal to a quantity of the relay pins, the relay pin attachment bores centered on a radial line from the axis of rotation through a center of a respective lug, wherein each relay pin is retained in the respective relay pin attachment bore.

9. The locking differential assembly as defined in claim 8 wherein a post diameter of the post of each relay pin is larger than a bore diameter of each relay pin attachment bore to form a press fit between the post of each relay pin and the respective relay pin attachment bore.

10. The locking differential assembly as defined in claim 8 wherein the post of each relay pin has a first screw thread defined thereon, wherein each relay pin attachment bore has a second screw thread complementary to the first screw thread defined therein, and wherein the each relay pin is threadingly fastened to the lock ring via engagement of the first screw thread with the second screw thread.

11. The locking differential assembly as defined in claim 10 wherein the plurality of lugs has a quantity of six lugs and a quantity of relay pins is three.

12. A locking differential system, comprising:
a differential case defining an axis of rotation;
a first side gear disposed at a first end of the differential case for selectable relative rotation thereto;
a second side gear disposed at a second end of the differential case opposite the first end for selectable rotation relative to the differential case;
a stator disposed at the first end;
a solenoid fixedly attached to the stator, the stator selectably magnetically actuatable to translate an axial translation distance by the solenoid;
a lock ring selectably engagable with the first side gear to selectably prevent the first side gear from rotating relative to the differential case;
at least two relay pins each connected to the lock ring and in contact with the stator to space the lock ring at least a predetermined distance from the stator; and
a stator position sensor to determine a state of the lock ring by detecting a position of the stator.

13. The locking differential system as defined in claim 12 wherein:
the stator position sensor is a non-contacting position sensor disposed on an anti-rotation bracket connected to the differential case; and
the non-contacting position sensor is to detect an axial position of the stator or a target affixed to the stator.

14. The locking differential system as defined in claim 13 wherein the non-contacting position sensor is a Hall-Effect position sensor.

15. The locking differential system as defined in claim 12 wherein:
the stator position sensor is a contact switch disposed on an anti-rotation bracket connected to the differential case;
the contact switch is to detect an axial position of the stator or a target affixed to the stator;
the contact switch has an open state and a closed state;
the contact switch opens an electrical circuit in the open state;
the contact switch closes the electrical circuit in the closed state; and
the contact switch is mechanically switched from the open state to the closed state by contact with the stator or the target affixed to the stator.

* * * * *